United States Patent
Sih

[15] 3,671,397
[45] June 20, 1972

[54] METHOD OF PREPARING L-DOPA

[72] Inventor: Charles J. Sih, Madison, Wis.

[73] Assignee: Wisconsin Alumni Research Foundation, Madison, Wis.

[22] Filed: Sept. 29, 1969

[21] Appl. No.: 862,061

Related U.S. Application Data

[63] Continuation-in-part of Ser. No. 826,003, May 19, 1969, abandoned.

[52] U.S. Cl. ............................................................. 195/29
[51] Int. Cl. ...................................................... C12d 13/06
[58] Field of Search ..................................................... 195/29

[56] References Cited

OTHER PUBLICATIONS

Chemical Abstracts 52:16475f (1958)
Haas et al., "Biochem. Biophys. Acta." 6:589–600 (1951)
Chemical Abstracts 49:104086 (1955) and the index therefor, Fifth Dec. Index: 13007s
Chemical Abstracts 55:15596h–15597a (1961)
Chemical Abstracts 50:1956h–1957a (1956)

*Primary Examiner*—A. Louis Monacell
*Assistant Examiner*—Max D. Hensley
*Attorney*—Howard W. Bremer

[57] ABSTRACT

A process for preparing L-dopa from L-tyrosine and derivatives thereof which comprises suitably blocking the amino function of the tyrosine and subjecting the resulting compound to the fermentative action of an organism which elaborates an oxygenating enzyme.

17 Claims, No Drawings

METHOD OF PREPARING L-DOPA

CROSS REFERENCE TO RELATED APPLICATION

This application is a continuation-in-part of application Ser. No. 826,003, filed May 19, 1969, now abandoned.

The invention described herein was made in the course of, or under, a grant from the U.S. Public Health Service, Department of Health, Education, and Welfare.

This invention relates to a process for the microbiological oxygenation of organic compounds.

More specifically, this invention relates to a process for preparing L-dopa from tyrosine or certain of its derivatives.

It has been recently reported (The New England Journal of Medicine, Volume 280, No. 7, Feb. 13, 1969) that L-3,4-dihydroxyphenylalanine (L-dopa) shows great promise as a treatment for Parkinsonism. It is apparent from this publication that substantial amounts of L-dopa must be administered on a daily basis to control chronic Parkinsonism and that such treatment must be continued for the life of the patient if continuing relief from the symptoms of Parkinsonism are to be realized.

At the present time L-dopa is manufactured via a total chemical synthesis and is relatively expensive. Consequently, continued usage for control of Parkinsonism at the levels suggested in the article referred to above may become prohibitively expensive for the individual.

A new method has now been found for producing L-dopa which promises to substantially reduce its cost and therefore make it more readily and generally available.

Broadly, this method comprises blocking the amino function of tyrosine or derivatives thereof and then subjecting the resulting compounds to the fermentative enzymatic action of certain microorganisms followed by cleavage of the substituent blocking group to produce the desired compound.

More specifically, the process of this invention comprises subjecting a compound in the L-isomeric configuration characterized by the formula:

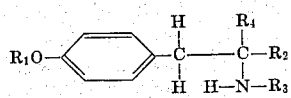

where $R_1$ is hydrogen, acyl or carbobenzoxy
$R_2$ is hydrogen, carboxy, carboxy-ester or carboxyamide
$R_3$ is an acyl blocking substituent to mask the amino function and
$R_4$ is hydrogen or methyl to the fermentative enzymatic action of a microorganism which elaborates an oxygenating enzyme, recovering from the fermentation reaction mixture a compound characterized by the formula:

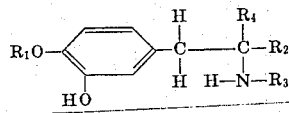

where each of $R_1$, $R_2$, $R_3$ and $R_4$ have the same identity as above and cleaving the acyl blocking substituent masking the amino function to obtain L-dopa or α-methyl dopa.

The substitution of an acyl blocking group at $R_3$ prevents the microorganism from attacking the amino group in the tyrosine molecule which comprises the basic starting material in the procedure of this invention. The functioning of the blocking group to accomplish this end is fully set forth in "Chemistry of the Amino Acids," Greenstein and Winitz, Vol. 2, p. 883 et seq., published by John Wiley & Sons, Inc., 1961.

For purposes of this invention the acyl blocking substituent can be selected from carbobenzoxy, phthalyl, p-toluenesulfonyl, trityl, trifluoro-acetyl, formyl, phenylthiocarbonyl, benzylsulfonyl, p-nitrocarbobenzoxy, 0-nitrophenoxyacetyl, chloroacetyl or t-butyloxycarbonyl(Boc). Cleaving of the blocking substituent from the molecule after the fermentation reaction is complete can be accomplished through hydrogenation in the presence of a palladium catalyst or through various acid treatments depending upon the particular acyl blocking substituent used (see Greestein et al., supra, pg. 1,243 et seq.).

Although the preferred starting material in the present process is that compound having the structural formula set forth above wherein $R_1$ and $R_4$ are hydrogen, $R_2$ is carboxy and $R_3$ is formyl, carbobenzoxy or t-butyloxycarbonyl, other compounds are, of course, usable. For example, $R_1$ can be a methyl or acetyl group; $R_4$ can be methyl when it is desired to produce α-methyl dopa; $R_2$ can be a methyl, ethyl or propyl carboxy ester or amide. It is obvious that when various of these substituents are used the end product will be a substituted L-dopa.

Although it is theorized that the enzyme tyrosinase or peroxidase are the effective oxygenating enzymes in the process of this invention any microorganism which elaborates an oxygenating enzyme can be used to transform N-blocked L-tyrosine or its derivatives into L-dopa or N-substituted L-dopa derivatives. There are, of course, variations in the efficiency with which different genera and species of microorganisms accomplish such process. However, the relative efficiency of a given organism to accomplish such oxygenation can be readily ascertained from the screening procedure which is outlined below. In general organisms of the order Moniliales or Eurotiales are the organisms of preference.

GENERAL SCREENING PROCEDURE TO DETERMINE EFFICIENCY OF ANY SPECIFIC ORGANISM

Inoculate the microorganism onto Sabouraud's agar slants or other agar base media suitable for growth. Place the inoculated slants in an incubator maintained at 25° C. and allow to grow for 1 week. Remove the slant and add 15 ml of sterile distilled water to it. Loosen the spores and vegetative growth from the agar with a sterile needle. Transfer the suspension to a flask containing 50 ml of the soy-dextrose medium described below and place the flask in a rotary shaker in an incubator maintained at 25° C. at about 210 r.p.m. for 24 hours. After this initial time period (first stage seed), add 5 ml of the submerged growth to each of duplicate flasks of three types of media, namely, soy-dextrose, cerelose Edamine and dextrin-cornsteep, the compositions of which are given below. Place the flasks in the shaker and allow to grow from about 24 to about 48 hours at 25° C. Add to one flask of each pair 15 mg. of any substrate substituted L-tyrosine in 0.25 ml of dimethylformamide. Add to the other flask of each pair 0.25 ml of dimethylformamide to serve as the control. Agitate all of the flasks under the same conditions for an additional 36 hours and remove from the shaker. Note the growth characteristics and pH and then acidify the whole beer of each flask with 2 ml of 6N HCl and extract once with a volume of ethyl acetate equal to the volume of beer. Remove the solvent of each extract by warming in a water bath at about 60° C. Dissolve each residue in 1 ml of acetone for application to thin-layer plate for chromatographic analysis.

The screening samples are then all chromatographed on silica gel G plates using a suitable system, a preferred one being ethyl acetate-acetic acid-isooctane-$H_2O$(110:20:50:100). After development, the plates are then sprayed with the diazotized sulfanilic acid reagent; tyrosine derivatives gave yellow spots whereas catechol derivatives gave orange-brown spots. The hydroxy-tyrosine product appears as a spot less mobile (more polar) than the starting tyrosine derivative in said preferred system.

Constitution of illustrative nutrient media suitable for the above screening procedure and for the batch fermentations given below in the examples are as follows:

Soy-Dextrose

Soybean meal                   5 g.

| | |
|---|---|
| Dextrose | 20 g. |
| NaCl | 5 g. |
| K₂HPO₄ | 5 g. |
| Yeast | 5 g. |
| Water | 1 l. |
| pH adjusted to 7.0 | |

Autoclave at 15 psi for 15 minutes.

Cerelose-Edamine

| | |
|---|---|
| Cerelose (crude dextrose) | 50 g. |
| Edamine* | 20 g. |
| Cornsteep liquor | 5 ml. |
| Water | 1 l. |
| pH adjusted to 7.0 | |

*An enzymatic hydrolysate of milk protein obtainable from Sheffield Farms. Co.

Dextrin-Cornsteep

| | |
|---|---|
| Dextrin | 10 g. |
| Cornsteep liquor | 80 g. |
| KH$_2$PO$_4$ | 1 g. |
| NaCl | 5 g. |
| Water | 1 l. |
| pH adjusted to 7.0 | |

Autoclave at 15 psi for 30 minutes.

The above general screening procedure and nutrient media, as well as the fermentations in the Examples below are illustrative only and can be varied in different ways. Thus, other microorganisms which effect the oxygenation process of this invention than those specifically recited can be used; sources of nitrogen and carbon in the nutrient media other than those specified above may also be employed. (For example, corn meal, oat meal, meat extract or other protein hydrolysates can be used or sucrose, glucose, maltose, starch, molasses, etc., can be substituted for the dextain.) Also, other modifications familiar in the fermentation art may be employed — the time of addition of the substrate after addition of the medium can be varied; the initial pH for addition and conversion of the substrate can be varied from about 5.0 to about 7.5; and the quantity of substrate and the stirring rate can be varied.

Products produced in accordance with the following Examples were identified as to structure through the use of ultraviolet, infrared, and nuclear magnetic resonance spectra, and by thin-layer chromatographic mobilities.

EXAMPLE 1

L-N-carbobenzoxyl-3,4-dihydroxyphenylalanine was prepared as follows:

A. Fermentation

The surface growth from a one week old agar slant of *Aspergillus ochraceus* was suspended in 5 ml of saline (0.85%) solution. Two ml portions of this spore suspension were used to inoculate 50 ml of the soybean-dextrose medium above held in 250 ml Erlenmeyer flasks (F-1 stage). The flasks were incubated at 25° C. on a rotary shaker (250 cycels/min. - 2 inch radius) for 24 hours, after which a 10 percent by volume transfer was made to each of four 2 liter Erlenmeyer flasks (F-2 stage), containing 500 ml of the soybean dextrose medium. After 24 hours of incubation on a rotary shaker, 250 mg of L-N-carbobenzoxy-tyrosine (Sigma Chemical Co.), dissolved in 2 ml of dimethylformamide was added to each flask. The F-2 stage flasks were then incubated for an additional 24 hours under the conditions used in the incubation of the F-1 stage flasks.

B. Isolation

Twenty-four hours after the addition of the L-N-carbobenzoxytyrosine, the mycelia were removed by filtration through cheese-cloth. The filtrate was acidified with 6N HCl to pH 2.8, and successively extracted with three 800 ml portions of ethyl acetate. The combined ethyl acetate extracts were evaporated to dryness in vacuo. The residue 1.97 g was chromatographed over a silicic acid column (1 × 8 inch). Elution of the column with benzene-ethyl acetate (75:25) afforded 523 mg of L-N-carbobenzoxy-3,4-dihydroxyphenylalanine, identical to a sample, prepared by acylation of L-dopa. The product gave an orange-brown color with diazotized-sulfanilic acid spray; it has a mobility on silica gel G thin layer plates of 0.9 that of N-carbobenzoxy-tyrosine.

When the compound (200 mg) was dissolved in a 1:1 mixture of acetic acid and water (20 ml) and hydrogenated for 16 hours in the presence of 10 percent palladium or charcoal, 63 mg of L-dopa, m.p. 286° dec. was obtained. This compound was identical in all respects to an authentic specimen of L-dopa as determined by various spectra and chromatographic determinations.

EXAMPLE 2

L-N-carbobenzoxy-3,4-dehydroxyphenylalanine was prepared in accordance with the procedure of Example 1 except that *Aspergillus quercinus* was used as the microorganism to effect the oxygenation.

EXAMPLE 3

L-N-carbobenzoxy-3,4-dihydroxyphenylalanine was prepared in accordance with the procedure of Example 1 except that *Aspergillus sclerotiorum* was used as the microorganism to effect the oxygenation.

The procedure of Example 1 was repeated with a number of different microorganisms as indicated in the following table. Conversion to L-dopa was obtained in all cases.

| Example | Microorganism |
|---|---|
| 4 | Scopulariopsis constantini |
| 5 | Scopulariopsis brevicaulis |
| 6 | Tritirachium dependens |
| 7 | Memnoniella echinata |
| 8 | Stysanus fimetarius |
| 9 | Botrysporium sp. |
| 10 | Stemphylium solani |
| 11 | Penicillium duclauxi |
| 12 | Penicillium vermiculatum |
| 13 | Penicillium thomii |
| 14 | Alternaria sp. |
| 15 | Monascus sp. |

EXAMPLE 16

A. Fermentation

The surface growth from a 1 week old agar slant of *Aspergillus ochraceus* was suspended in 5 ml of saline (0.85 percent) solution. Two and one-half ml portions of this suspension were used to inoculate 50 ml of the soy-bean dextrose medium, held in an 250 ml Erlenmeyer flask (F-1 stage). The flask was incubated at 25° C. on a rotary shaker (250 cycles/min. - 2 inches radius) for 24 hours, after which a 10 percent by volume transfer was made to each of two 2 liter Erlenmeyer flasks (F-2 stage), containing 500 ml of the soybean-dextrose medium. After 24 hours of incubation on a rotary shaker, 250 mg of L-t-butoxycarbonyl-tyrosine, dissolved in 2 ml of dimethylformamide was added to each flask. The F-2 stage was incubated for an additional 60 hours.

B. Isolation

At 60 hours, the fermentation was terminated by filtration through cheese cloth to remove the mycelia. The filtrate was acidified with 6N HCl to pH 2.5 and was successively extracted with three 600 ml portions of ethyl acetate. The combined ethyl acetate extracts were evaporated to dryness in vacuo. The residue was chromatographed over 22 g of silicic acid containing 15 percent celite (a diatomaceous silica product marketed by Johns-Manville Company). Elution of the column with 23 percent-ethyl acetate in benzene afforded 141 mg of t-boc-L-tyrosine and 200 mg t-boc-L-dopa.

It has been found that maximum yields of L-dopa are obtained when the substrate is N-formyl-L-tyrosine and if certain other precautions are observed as is more specifically set forth hereinafter.

EXAMPLE 17

A. Fermentation

The surface growth from a one week old agar slant of *Gliocladium deliquescens* was suspended in 5 ml of saline (0.85 percent) solution. Two and one-half ml portions of this suspension were used to inoculate 25 ml of the soybean-dextrose medium held in a 125 ml Erlenmeyer flask (F-1 stage). The flask was incubated at 25° C. on a rotary shaker (250 cycles/min. -2 inch radius) for 48 hours, after which a 10 percent by volume transfer was made to another 125 ml Erlenmeyer flask (F-2 stage), containing 25 ml of the soybean-dextrose medium. After 12 hours of incubation on a rotary shaker, 750 mg of L-N-formyl tyrosine (prepared according to S. G. Waley and J. Watson, Biochem. J. 57, 529 (1954)), dissolved in 2 ml of 1 M solution of $KHCO_3$ was added to the flask. The F-2 stage flask was then incubated for an additional 42 hours under the condition used in the incubation of the F-1 stage flasks. L-ascorbic acid was added intermittently to the F-2 stage flask in five portions at 0, 12, 18, 24 and 36 hrs. A total of 500 mg of L-ascorbic acid (dissolved in 0.2 M Phosphate buffer pH 6.8) was added. The transformation was most active during the period 20-30 hours after substrate addition. Therefore, most of the L-ascorbic acid was added during this interval.

B. Isolation

Forty-two hours after the addition of the L-N-formyl-tyrosine, the mycelia were removed by filtration through cheese-cloth. The filtrate was acidified with 6N HCl to pH 2.5, and successively extracted with three 25 ml portions of n-butanol. The combined butanol extracts were evaporated to dryness in vacuo. The residue was dissolved in 20 ml of 5N HCl and was allowed to stand at room temperature for 12 hrs. After evaporation of the aqueous HCl, the residue was dissolved in 5 ml of 0.75N HCl and chromatographed over a Dowex 50 X-4 (200–400 mesh) Column (2 × 28 cm) H$^+$ form. The column was eluted with 0.75N HCl and successive 9.5 ml fractions were collected 186 mg of L-3,4-dihydroxyphenylalanine HCl; $[\alpha]_n^{25} - 11°$ (C, 4% HCl) was found in fractions 35–46 and 375 mg of L-tyrosine in fractions 48–59

The procedure of Example 17 was repeated with a number of different microorganisms as shown below. Conversion to N-formyl-L-dopa was obtained in all cases.

| Example | Microorganism | |
|---|---|---|
| 18 | Gliocladium flavo-fuscum | ATCC 13308 |
| 19 | " virens | ATCC 13213 |
| 20 | " roseum | ATCC 8684 |
| 21 | Trichoderma viride | NRRL 2299 |
| 22 | " " | ATCC 13362 |
| 23 | Stemphylium solani | NRRL 1805 |
| 24 | " asperuli | NRRL 1620 |
| 25 | " consortiale | NRRL 4136 |
| 26 | Corynespora cassiola | |
| 27 | Scopulariopsis constantini | NRRL 1860 |
| 28 | Curvularia geniculata | |
| 29 | Memnoniella echinata | NRRL 1982 |
| 30 | Fusarium solani | |
| 31 | Aspergillus ochraceous | |
| 32 | Cylindrocarpon radicicola | |
| 33 | Ophiobolus | |

In the foregoing Examples the L-ascorbic acid should be added intermittently during the fermentation to prevent the formation of melanins. In the absence of L-ascorbic acid the oxygenating enzyme will oxidize N-formyl-L-dopa to melanins which results in the fermentation broth turning black and in a lower yield of L-dopa. L-ascorbic acid is preferably used in the process of this invention regardless of the substrate which is being converted to L-dopa or a derivative thereof but precautions must be taken, particularly during the most active fermentation period which occurs under the noted conditions 20–30 hours after addition of the substrate to maintain the pH of the fermentation broth in the range from about 6.7 – 6.9 to achieve the best results.

It has also been observed that the addition of a small amount of hydrocinnamic acid to the fermentation broth appears to stimulate the conversion to L-dopa as is evident from the data below. The hydrocinnamate appears to act as an inducer of the oxygenating enzyme. Optimum concentration of hydrocinnamate in the fermentation broth to achieve the desired effect is in the range from about $5 \times 10^{-5}$ M to about $1 \times 10^{-4}$ M.

Effect of Hydrocinnamate (HC)

on L-dopa Formation

Substrate: N-formyl-L-tyrosine (30 g/l)

Conditions: As in Example 17 above including L-ascorbic acid addition

| Experiment I | % Yield L-dopa | Remaining L-tyrosine |
|---|---|---|
| (32 hr. fermentation) | | |
| Control (no HC) | 10.6 | 65 |
| 1×10⁻⁴ M (HC) | 17.0 | 60 |
| Experiment II | | |
| (62 hr. fermentation) | | |
| Control (no HC) | 14.0 | 30.5 |
| 1×10⁻⁴ M (HC) | 18.5 | 37.7 |

It will be appreciated by those skilled in the art that yields obtained in the process of this invention can be improved by controlling aeration and pH of the fermentation broth, through continuous L-ascorbic acid addition, medium development, strain selection of microorganisms, hydrocinnamic acid addition, etc.

Although the processes of the previous Examples were carried with a substrate concentration of 30 g/l, concentrations as high as 100 g/l can be used. Concentrations less than 30 g/l are also usable but economics dictate the use of the highest concentrations possible.

It is to be understood that in any of the foregoing Examples the fermentative enzymatic action of the microorganism can be obtained by utilizing the spores of the organism which are known to elaborate active enzyme principles (see, for example, U.S. Pat. No. 3,031,379 to S. G. Knight, issued Apr. 24, 1962).

Having thus described the invention, what is claimed is:

1. A process for preparing L-dopa and derivatives thereof which comprises subjecting a compound in the L-isomeric configuration characterized by the formula

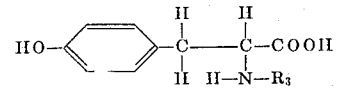

where $R_3$ is an acyl blocking group to mask the amino function, to the fermentative action of an organism selected from the orders Moniliales and Eurotiales which elaborates an enzyme capable of oxygenating said compound, intermittently adding to the fermenting reaction mixture ascorbic acid in amounts sufficient to inhibit the formation of melanins, recovering from the fermentation reaction mixture a compound of the formula

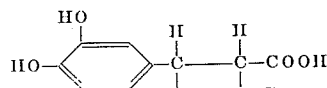

where $R_3$ has the same identity as above and cleaving the acyl blocking group masking the amino function.

2. The process of claim 1 wherein the organism is selected from the genera Gliocladium, Scopulariopsis, Tritirachium, Stysanus, Botrysporium, Trichoderma, Stemphylium, Memnoniella, Curvularia, Penicillium, Fusarium, Aspergillus, Monascus, Corynespora, Cylindrocarpon and Ophiobolus.

3. The process of claim 1 wherein hydrocinnamic acid is added to the fermenting reaction mixture.

4. The process of claim 1 wherein $R_3$ is selected from carbobenzoxy, p-toluenesulfonyl, phthalyl, trityl, trifluoroacetyl, formyl, phenylthiocarbonyl, benzylsulfonyl, p-nitrocarbobenzoxy, o-nitrophenoxyacetyl, chloroacetyl or t-butyloxycarbonyl.

5. The process of claim 1 wherein $R_3$ is carbobenzoxy.

6. The process of claim 1 wherein $R_3$ is formyl.

7. The process of claim 6 wherein the organism is of the genus Gliocladium.

8. The process of claim 7 wherein the organism is Gliocladium flavo-fuscum ATCC 13308.

9. The process of claim 6 wherein the organism is of the genus Trichoderma.

10. The process of claim 9 wherein the organism is Trichoderma viride.

11. The process of claim 6 wherein the organism is of the genus Stemphylium.

12. The process of claim 11 wherein the organism is Stemphylium solani NRRL 1805.

13. The process of claim 11 wherein the organism is Stemphylium consortiale NRRL 4136.

14. The process of claim 6 wherein the organism is of the genus Corynespora.

15. The process of claim 14 wherein the organism is Corynespora cassiola.

16. The process of claim 6 wherein the organism is of the genus Scopulariopsis.

17. The process of claim 16 wherein the organism is Scopulariopsis constantini NRRL 1860.

* * * * *